W. HOPPIE.
DRY CELL.
APPLICATION FILED FEB. 14, 1916.
1,209,298.
Patented Dec. 19, 1916.
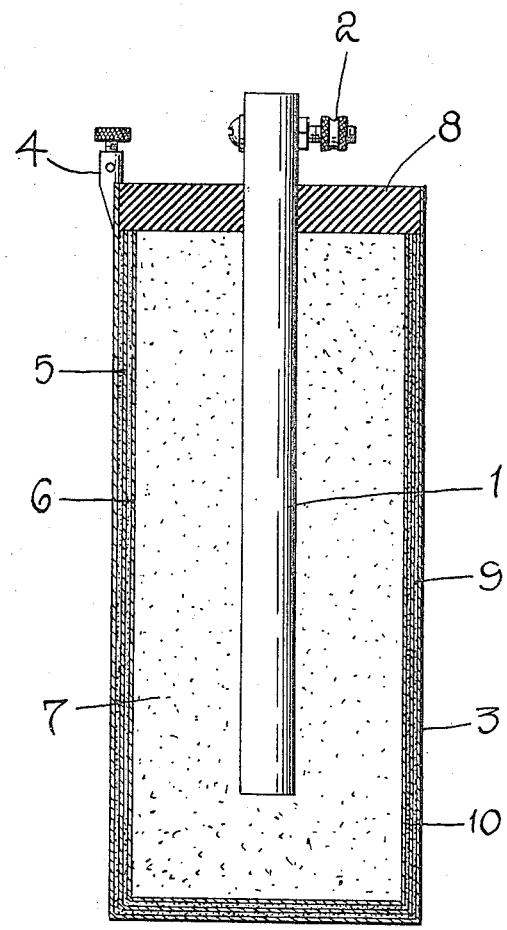
Inventor
W. HOPPIE
By Watson E. Coleman
Attorney

UNITED STATES PATENT OFFICE.

WILLIAM HOPPIE, OF LAWNDALE, CALIFORNIA, ASSIGNOR TO WILLIAM J. LATCHFORD, OF LOS ANGELES, CALIFORNIA.

DRY CELL.

1,209,298.  Specification of Letters Patent.  Patented Dec. 19, 1916.

Application filed February 14, 1916. Serial No. 78,204.

*To all whom it may concern:*

Be it known that I, WILLIAM HOPPIE, a citizen of the United States, residing at Lawndale, in the county of Los Angeles and State of California, have invented certain new and useful Improvements in Dry Cells, of which the following is a specification, reference being had to the accompanying drawings.

This invention relates to certain improvements in that type of galvanic cells commonly known as dry cells, and it is an object of my invention to provide a device of this general character having novel and improved means whereby the deterioration of the cell during its "shelf life" or during the period before it is put into active service is prevented, and furthermore to prevent deterioration during long periods of inactivity after being placed in use.

The invention consists in the details of construction and in the combination and arrangement of the several parts of my improved device whereby certain important advantages are attained and the device is rendered simpler, less expensive and otherwise more convenient and advantageous for use, all as will be hereinafter more fully set forth.

The novel features of the invention will be carefully defined in the appended claims.

In order that my invention may be the better understood, I will now proceed to describe the same with reference to the accompanying drawings, wherein is disclosed a longitudinal sectional view of a cell constructed in accordance with an embodiment of my invention.

As disclosed in the accompanying drawing, 1 denotes a negative electrode provided with a binding post 2 which constitutes one of the terminals of the battery. The container 3, as herein embodied, is made of zinc and constitutes the positive electrode. To this zinc container the binding post 4 is attached to provide the second terminal of the battery. Within the zinc container 3 are the bibulous or porous linings 5 and 6 which serve the well known purpose of preventing the battery mix 7 which is packed in the lined container from coming in contact with the zinc container and also serve as a reservoir for the electrolyte. The mix may be of any of the well known compositions. The cell is sealed in the ususal manner by a covering 8 which prevents any deterioration from the action of the atmosphere and external sources and also makes the cell impervious to water.

I have found it an advantage to use an organic viscid substance in contact with one of the electrodes of a dry cell, and a double bibulous lining with a coating of a viscid substance carried between the linings. For this coating I have found the following viscid mixture to give the best results. Zinc chlorid is dissolved in water until it shows a specific gravity of 1.200, this solution is then saturated with ammonium chlorid, and starch or flour is mixed therewith until the mixture has the consistency of cream or molasses. In giving the specific gravity as 1.200, the same is based on the showing on the scale of the universal hydrometer for light and heavy liquids. This mixture is let stand in a covered container for several days until all chemical action has ceased, resulting in a viscid, glutinous composition. A coating of the composition is then applied to the inner surface of the zinc electrode as shown at 9, a bibulous lining 5 is then inserted and another coating 10 applied to the inner surface of the bibulous lining 5 and the bibulous lining 6 is then inserted and the cell is ready to be filled.

The advantage I gain by this double lining and viscid coatings is an active material in contact with the zinc electrode that does not dry out and increase the internal resistance of the cell, and is especially desirable for use in that type of dry cell known as a telephone cell wherein the cell is used for very brief periods and then left out of circuit for long periods. It is clear that my invention will obviate the trouble caused by a cell drying out and dying under long periods of intermittent use.

By having a plurality of bibulous linings with the above viscid electrolyte carried between the linings and upon the surface, the use of a greater quantity of electrolyte is permitted which in practice has been found of essential import as the electrolyte retains its moistened condition for a greater period of time.

It is obvious that my invention can be used in any form of dry cell, and I do not think it necessary to describe the methods by which it can be adapted to other forms of construction as they are self-evident.

From the foregoing description, it is thought to be self-evident that a cell constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

1. In a dry cell, a coating for one of the electrodes consisting of an organic viscid substance, a bibulous lining therefor, a viscid coating upon the bibulous lining and a second bibulous lining placed thereon.

2. In a dry cell, a container constituting one of the electrodes, an interior coating for the container consisting of an organic viscid substance, a bibulous lining therefor, a viscid coating upon the inner face of the bibulous lining, and a second bibulous lining placed thereon.

In testimony whereof I hereunto affix my signature in the presence of two witnesses.

WILLIAM HOPPIE.

Witnesses:
LILLIAN MOSELEY,
MARION W. BESSOM.